(12) United States Patent
Lee

(10) Patent No.: US 9,740,657 B2
(45) Date of Patent: Aug. 22, 2017

(54) MEMORY DEVICE FOR MULTIPLE PROCESSORS AND MEMORY SYSTEM HAVING THE SAME

(71) Applicant: Foundation of Soongsil University-Industry Cooperation, Seoul (KR)

(72) Inventor: Chanho Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 81 days.

(21) Appl. No.: 14/318,783

(22) Filed: Jun. 30, 2014

(65) Prior Publication Data

US 2015/0153966 A1    Jun. 4, 2015

(30) Foreign Application Priority Data

Nov. 29, 2013    (KR) ........................ 10-2013-0147780

(51) Int. Cl.
*G06F 13/00* (2006.01)
*G06F 13/42* (2006.01)

(52) U.S. Cl.
CPC ................................ *G06F 13/4234* (2013.01)

(58) Field of Classification Search
CPC .................................................. G06F 13/4234
See application file for complete search history.

(56) References Cited

U.S. PATENT DOCUMENTS

| 9,064,602 B2* | 6/2015 | Hunter ................... G11C 11/408 |
| 2007/0089030 A1* | 4/2007 | Beracoechea ........... H04L 49/90 |
| | | 714/762 |
| 2010/0036997 A1* | 2/2010 | Brewer .................... G06F 12/04 |
| | | 711/5 |
| 2010/0208540 A1 | 8/2010 | Shiu et al. |
| 2014/0301404 A1* | 10/2014 | Zheng ....................... H04L 1/22 |
| | | 370/419 |
| 2015/0358185 A1* | 12/2015 | Cai .......................... H04L 25/14 |
| | | 370/474 |

FOREIGN PATENT DOCUMENTS

| JP | 2009-230792 A | 10/2009 |
| KR | 10-2003-0042906 A | 6/2003 |
| KR | 10-2010-0127317 A | 12/2010 |

* cited by examiner

*Primary Examiner* — Yong Choe
(74) *Attorney, Agent, or Firm* — Novick, Kim, & Lee, PLLC; Sang Ho Lee

(57) ABSTRACT

A memory device for multiple processors capable of processing a plurality of memory access requests and a memory system having the same are provided. The memory device includes one command and control signal port configured to receive a command and control signal from a memory controller, one address port configured to receive an address signal from the memory controller, a data port configured to form a plurality of data channels being independently driven to simultaneously process a plurality of memory access requests of the memory controller, and a plurality of memory banks divided into a plurality of sub-banks to simultaneously perform operations according to the plurality of memory access requests when the plurality of memory access requests are sequentially transmitted through the command and control signal port and the address port.

14 Claims, 4 Drawing Sheets

(a)

(b)

(c)

(a)

(b)

MEMORY DEVICE FOR MULTIPLE PROCESSORS AND MEMORY SYSTEM HAVING THE SAME

CROSS-REFERENCE TO RELATED APPLICATION

This application claims priority to and the benefit of Korean Patent Application No. 10-2013-0147780, filed on Nov. 29, 2013, the disclosure of which is incorporated herein by reference in its entirety.

BACKGROUND

1. Field of the Invention

The present invention relates to a memory device suitable for various memory accesses of multiple processors, and a memory system having the same.

2. Discussion of Related Art

With the developments of process and design technology, performance of an application processor (AP) which is a real system on chip (SoC) has been improved enough to replace a computer. A computer having a wired or wireless communication function has been developed using four or more processors, a hardware accelerator for multimedia and three dimensional (3D) data processing, and various peripheral devices. According to such an increase in operation performance of the SoC, as various functions are performed, a large amount of data is required. When a memory device cannot rapidly respond to data access requests, there is a problem in which entire system performance deteriorates.

A method of increasing a bandwidth of the memory device to solve the problem has been used until now. That is, a dynamic random access memory (DRAM) device mainly used as a main memory increases its bandwidth by increasing an instantaneous maximum transmission speed of an interface by increasing an operational frequency in a double data rate (DDRx) method.

Although, in the method, an instantaneous maximum bandwidth is increased in proportion to the operational frequency due to an operation method of the conventional DRAM devices, there is a problem in which an effective bandwidth is not increased as expected.

When one job is divided into several processes and the multiple processors simultaneously execute the processes, the processors can operate in a pipeline scheme by sequentially operating according to the order of accessing the memory device, and show successful performance. On the other hand, when the processors simultaneously perform different jobs, since there is a large possibility of accessing different address areas and characteristics and urgency of required data are different, performance of a specific operation deteriorates and also the entire system performance deteriorates when the memory cannot respond to the requests in time.

Meanwhile, in a system with multiple processors, a memory controller should respond and operate according to quality of service (QoS) types. One among methods to solve the problem uses a plurality of memory devices and makes the multiple processors access different memory devices. However, it is difficult for the method to apply since it increase manufacturing cost, a size of the system, and power consumption.

SUMMARY OF THE INVENTION

The present invention is directed to a memory device for multiple processors capable of simultaneously processing various access requests, and a memory system having the same.

According to an aspect of the present invention, there is provided a memory device for multiple processors, including: one command and control signal port configured to receive commands and control signals from a memory controller; one address port configured to receive address signals from the memory controller; a data port configured to form a plurality of data channels being independently driven to simultaneously process a plurality of memory access requests of the memory controller; and a plurality of memory banks divided into a plurality of sub-banks to simultaneously process operations according to the plurality of memory access requests when the plurality of memory access requests are sequentially transmitted through the command and control signal port and the address port.

The data port may include a plurality of data channels, data widths of the data channels may not be the same, and the number of the data channels is changeable.

The plurality of the data channels of the data port may be prepared in a number corresponding to the number of the memory access requests which need to be processed simultaneously.

The plurality of sub-banks prepared in the memory banks have different address areas, and may be processed simultaneously when the memory access requests are transmitted to the plurality of sub-banks, respectively.

Each of the plurality of sub-banks included in the memory bank may include sense amplifiers.

According to another aspect of the present invention, there is provided a memory system, including: a memory device including a plurality of memory banks, each memory bank divided into a plurality of sub-banks to simultaneously process a plurality of memory access requests; and a memory controller configured to form a plurality of channels to allow the memory device to simultaneously process the plurality of memory access requests, and control to input or output data of the memory device.

Each of the plurality of sub-banks may include sense amplifiers, and has a different address area.

The memory device and the memory controller may be connected by one address channel, one command and control signal channel, and a plurality of data channels.

The memory device may include a data port forming a plurality of channels, and the number of the data channels of the data port may be prepared in a number corresponding to the number of the memory access requests which is processed simultaneously.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
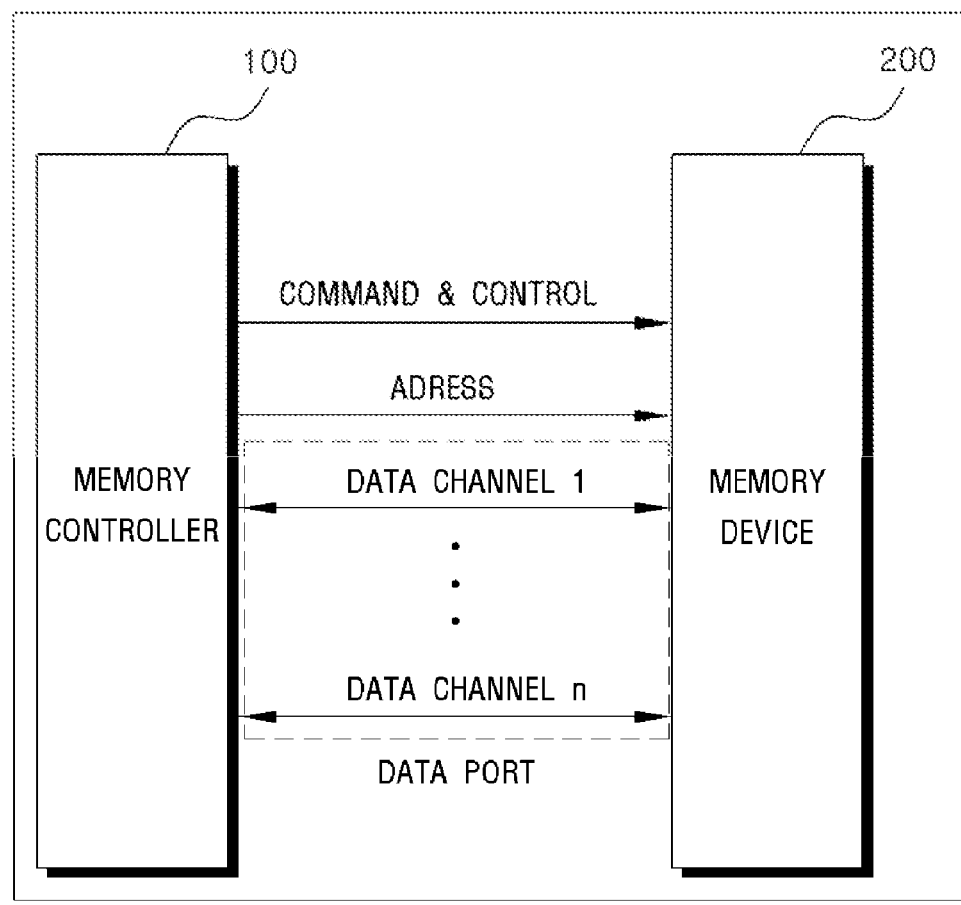
FIG. 1 is a diagram illustrating a memory system for multiple processors according to an embodiment of the present invention.
Figure 2:
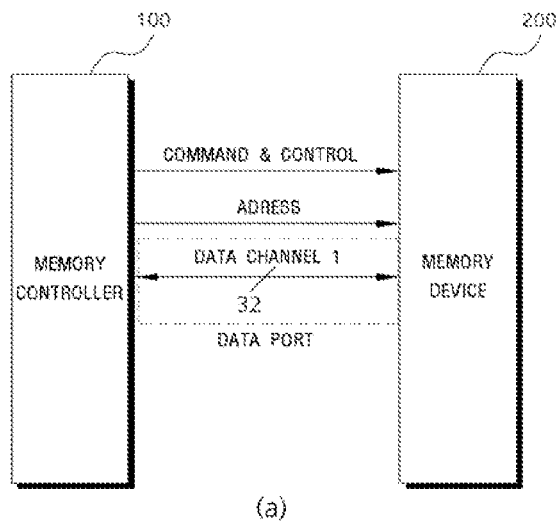
FIG. 2 is a diagram illustrating an example of a data port construction of a memory system for multiple processors according to an embodiment of the present invention.
Figure 2:
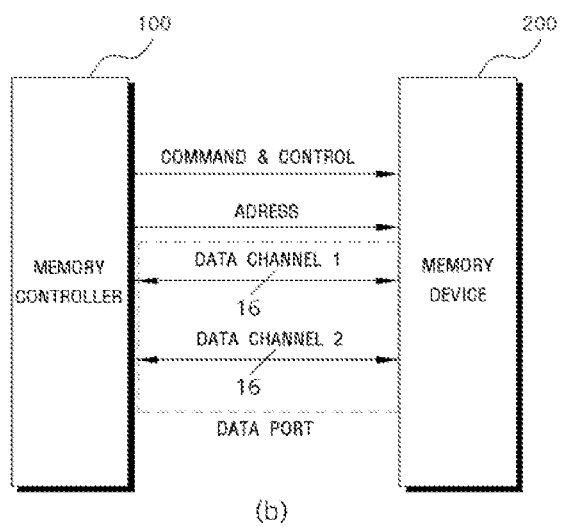
Figure 2:
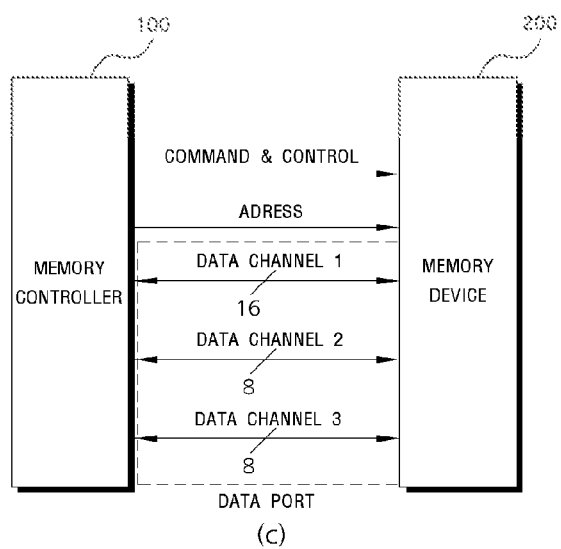
Figure 3:
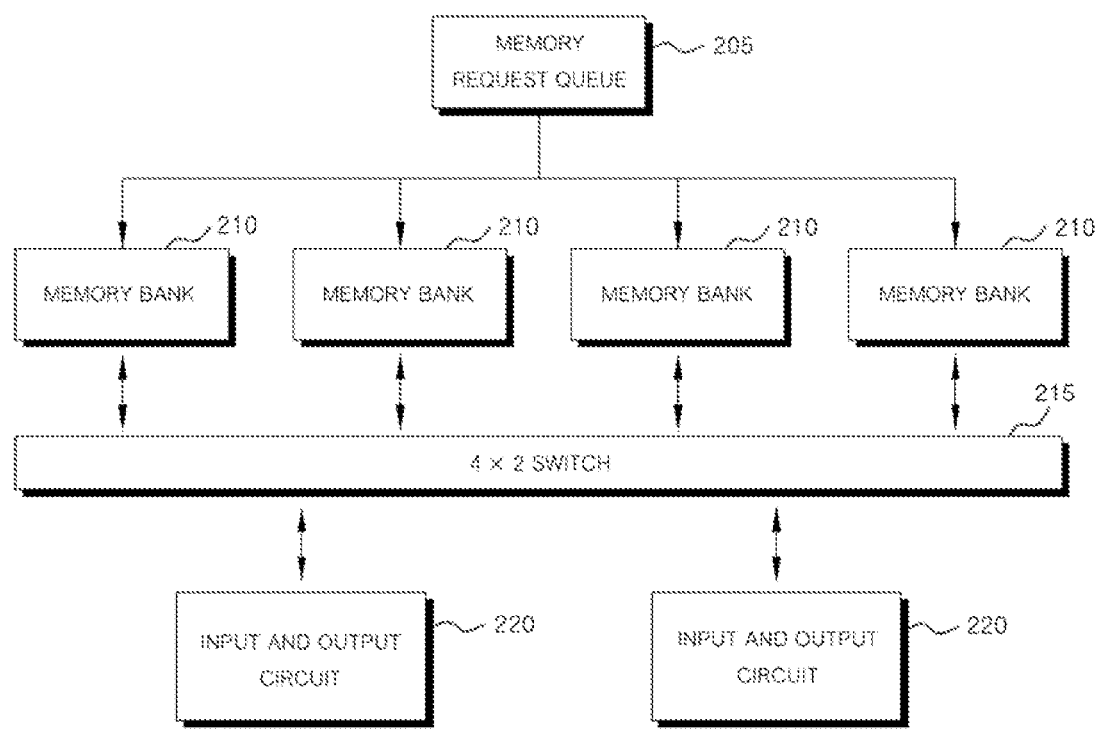
FIG. 3 is a diagram illustrating a detailed construction of a memory device according to an embodiment of the present invention.

FIG. 1 is a diagram illustrating a memory system for multiple processors according to an embodiment of the present invention, FIG. 2 is a diagram illustrating an example of a data port construction of a memory system for multiple processors according to an embodiment of the present invention, and FIG. 3 is a diagram illustrating a detailed construction of a memory device according to an embodiment of the present invention.

A memory system 1 may include a memory controller 100 and a memory device 200.

The memory controller 100 may transmit commands to the memory device 200, and thus control to input or output data.

The memory controller 100 may determine and store a memory access request sequence based on the order in which a plurality of memory access requests are input and a memory address (bank and row information) extracted from each of the memory access requests.

The memory controller 100 may transmit a command and control signal, an address, and a plurality of data information to the memory device 200.

The memory controller 100 may include one command and control signal port (COMMAND & CONTROL), one address port (ADDRESS), and one data port (DATA Channel) including a plurality of data channels (DATA CHANNEL 1, . . . , DATA CHANNEL n) so as to transmit the above-described information to the memory device 200. The number of bits of each data channel may differ according to a type of memory. The data channel may be defined $2^n$ (n may be 0 or a natural number) such as ×4, ×8, ×16, ×32, etc. The number of bits of the data port may be configured by combinations of the number of bits of each data channel. Data port (a port comprising Data Channel 1, . . . , Data Channel n) is configured to change a number of data channels being independently driven by combining and dividing each port.

The memory device 200 may include a plurality of memory banks. Each of the plurality of memory banks may include a plurality of sub-banks. The memory device 200 may include a command & control signal port (COMMAND & CONTROL), an address port (ADDRESS), and a data port (DATA PORT) to communicate with the memory controller 100. The data port may form a plurality of data channels (DATA CHANNEL 1, . . . , DATA CHANNEL n). Here, the plurality of data channels (DATA CHANNEL 1, . . . , DATA CHANNEL n) may be independently driven, and an input and output circuit may be included in the memory device 200 to simultaneously process a plurality of memory access requests. That is, the memory device 200 may simultaneously process the memory access requests corresponding to the number of data channels (DATA CHANNEL 1, . . . , DATA CHANNEL n) having a dedicated input and output circuit. The increase in the number of data channels may be achieved by utilizing unused pins with packages specified by the JEDEC standard, or dividing the conventional data channel while maintaining the same number of pins. In this case, the data width of each data channel may not be the same. Referring to FIG. 2, when the data port has 32-bit, the data port may include one 32-bit channel (a), or two 16-bit channels (b). Further, the data port may include two 8-bit channels and one 16-bit channel (c). The data port may be configured by setting of a mode register. Since the data port may be configured by combinations of the data channels having $2^n$-bit, the data port having 12-bit may be configured by one 4-bit channel and one 8-bit channel.

Referring to FIG. 3, the memory device 200 including four memory banks and two data channels will be described as an example. The memory device 200 may receive a memory access request transmitted from the memory controller 100, the received memory access request may be transmitted to a corresponding memory bank 210 through a memory request queue 205, and an operation according to the received memory access request may be performed. The memory controller 100 may transmit the memory access requests so that the memory device 200 operates effectively, and the memory request queue 205 may process according to the order that the memory access requests are input. At this time, the memory device 200 may reorder and perform the memory access requests according to the state of the memory device 200. However, in this case, since the memory access request may be received and transmitted together with an identification number (ID), efficiency may be lowered. An operation corresponding to the memory access request may be performed by connecting a memory bank 210 and an input and output circuit 220 through a 4×2 switch 215. The 4×2 switch 215 may simultaneously provide two connection channels, and two memory access requests may be simultaneously processed. When a memory access request is transmitted, information on the data channel may be transmitted together, and the memory device 200 may select and connect the data channel according to the request of the memory controller 100. In FIG. 2, a structure having the 4×2 switch 215 was described as an example, but, various structures having a 4×4 switch, an 8×4 switch, an 8×8 switch, or the like may be available. Further, when a data channel having a consistently high bandwidth is needed for one user, the device may cope with the increase in a data width of the data channel by combining the plurality of data channels into one. The increase of the data width may be achieved by changing the configuration of the mode register.

Since the memory device 200 normally uses burst communication, there are many cases that a no operation (NOP) command is transmitted to a command port even when data is continuously transmitted. Accordingly, the memory device 200 according to an embodiment of the present invention may include a plurality of data ports, one command/control signal port, and one address port. Since the number of channels of the memory device 200 is equal to the number of memory channel requests which can be simultaneously processed, the memory controller 100 may transmit commands according to the memory access requests in consideration of the number of channels of the memory device 200.

Figure 4:
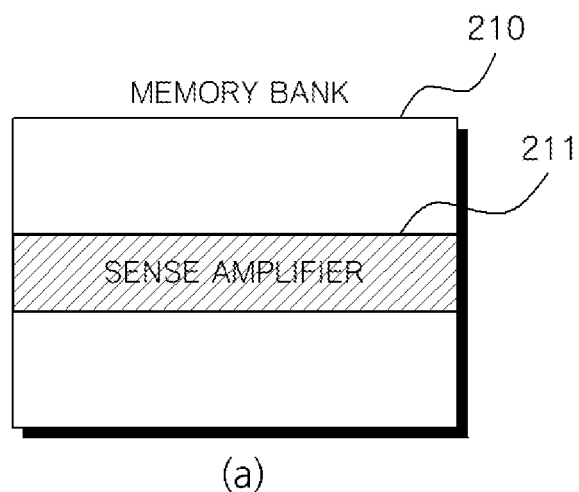
FIG. 4 is a diagram illustrating a structure of a memory bank included in a memory device according to an embodiment of the present invention.
Figure 4:
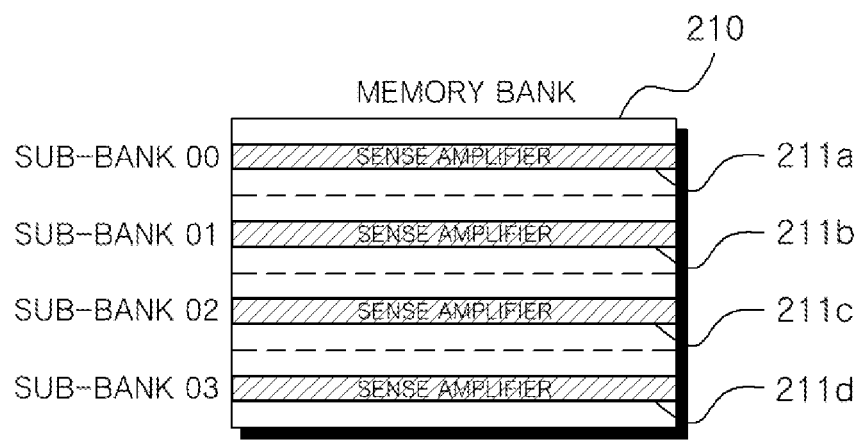

FIG. 4 is a diagram illustrating a structure of a memory bank included in a memory device according to an embodiment of the present invention.

The memory device 200 may be prepared to operate in units of sub-banks divided based on bit lines. Since the memory device 200 may operate in units of sub-banks, precharge and active operations may be performed in units of sub-banks. At this time, since the number of sense amplifiers increases in a number corresponding to the number of the sub-banks, an area may be increased. However, since a bit line capacitance is decreased, charging and discharging times may be reduced and the area that one sense amplifier occupies may also be decreased.

When the memory device 200 operates in units of sub-banks, since a possibility of simultaneously processing the memory access requests may be increased, a data port structure with multiple channels may be more effective. That is, when address areas of the memory access requests are included in the same bank, operations corresponding to the memory access requests cannot be simultaneously processed. However, when banks of the memory device 200 are divided into the sub-banks and the address areas of the memory access requests are located in different sub-banks, the operations corresponding to the memory access requests may be simultaneously processed. In FIG. 4 (a) illustrates a conventional memory structure, and an example that an entire memory bank 210 operates and a data path connected with an interface is a single path. In FIG. 4 (b) illustrates an example according to an embodiment of the present invention that the memory bank 210 is divided into four sub-banks (sub-bank 00, sub-bank 01, sub-bank 02, and sub-bank 03) and a sense amplifier is divided into four sense amplifiers 211a, 211b, 211c, and 211d. When the address areas of the memory access requests are located in different sub-banks (sub-bank 00, sub-bank 01, sub-bank 02, sub-bank 03), operations corresponding to the memory access requests may be simultaneously processed. As shown in (b) of FIG. 4, when there are four sub-banks (sub-bank 00, sub-bank 01, sub-bank 02, and sub-bank 03) and two data channels corresponding thereto, the number of sense amplifiers 211a, 211b, 211c, and 211d may be increased by four times. However, since a bit line capacitance has a value decreased by ¼ times, a time for precharging and sensing may be reduced and an area that each of the sense amplifiers 211a, 211b, 211c, and 211d occupies may be decreased. At this time, since the number of data channels is two, read/write operations may be simultaneously performed in two among four sub-banks (sub-bank 00, sub-bank 01, sub-bank 02, and sub-bank 03).

Meanwhile, the memory device 200 according to an embodiment of the present invention may perform a refresh operation, an active operation, and a precharge operation on each of sub-banks (sub-bank 00, sub-bank 01, sub-bank 02, and sub-bank 03).

Here, basically, the refresh operation may be an operation of activating and reading a row line, and a refresh period may differ according to a voltage, a temperature, process conditions, but normally has tens of milliseconds (ms). Further, the refresh operation may be performed once a refresh period on every row line. Moreover, the active operation may be an operation of activating a row line of a bank corresponding to a memory address which desires to access. When the bank which desires to access is deactivated, it may be possible to access only after activating the row line of the desired bank by the active operation. The precharge operation may be an operation of precharging the desired bank when completing a read or write operation of the row line in the desired bank and not using the desired bank any more, or desiring to access another row line of the same bank. The precharge operation may require two to three cycles according to an operational frequency with respect to a single data rate (SDR) synchronous dynamic random access memory (SDRAM).

The memory device 200 may include a plurality of memory banks 210, and the plurality of memory banks 210 may be independently activated or deactivated. For example, when the memory bank 0 is activated, the memory bank 1 may be activated and the memory bank 2 may be deactivated. When a read or write operation is performed in one memory bank 210 of the memory device 200, an active or precharge command may be transmitted to another memory bank 210. Further, when the read or write operation is performed in one memory bank 210 of the memory device 200, the read or write operation may be simultaneously performed in another memory bank of the memory device 200. Moreover, when the read or write operation is performed in one sub-bank of the memory bank 210 of the memory device 200, the read or write operation may be simultaneously performed in another sub-bank.

According to an embodiment of the present invention, the plurality of memory access requests can be simultaneously processed using the plurality of channels and sub-banks.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A memory device for multiple processors, the memory device comprising:
   a command and control signal port receiving a command and control signal from a memory controller;
   an address port receiving an address signal from the memory controller;
   a data port comprising a plurality of data channels being independently driven to simultaneously process a plurality of memory access requests to the memory controller;
   a mode register changing a number of the plurality of data channels being independently driven by combining or dividing the plurality of data channels; and
   a plurality of memory banks, wherein each of the plurality of memory banks is divided into a plurality of sub-banks to simultaneously perform operations according to the plurality of memory access requests when the plurality of memory access requests are sequentially transmitted through the command and control signal port and the address port, wherein each of the plurality of sub-banks is divided based on a bit line,
   wherein the mode register changes at least a part of data widths of the plurality of data channels to be different from one another by combining or dividing the plurality of data channels.

2. The memory device of claim 1, wherein data widths of the plurality of data channels are not the same, and the number of the plurality of data channel is changeable.

3. The memory device of claim 1, wherein the memory device receives the command and control signal of the memory access requests in consideration of the number of plurality of data channels of the data port from the memory controller.

4. The memory device of claim 1, wherein the plurality of sub-banks have address areas different from each other, and the plurality of memory access requests are processed simultaneously when the memory access requests are transmitted to the plurality of sub-banks, respectively, and wherein each of the plurality of sub-banks included in the plurality of memory banks comprises a sense amplifier.

5. The memory device of claim 1, wherein the each of the plurality of data channels has different bandwidth.

6. The memory device of claim 1, wherein the mode register combines or separates a part of the plurality of data channels to increase or decrease a data width, respectively.

7. The memory device of claim 1, wherein the memory device receives at least one memory access request from the memory controller and transmits the at least one memory access request to a corresponding memory bank, wherein the at least one memory access request is transmitted to the corresponding memory bank in the order of receipts or reordered to increase the memory device efficiency.

8. A memory system comprising:
 a memory device comprising:
  a plurality of memory banks, each memory bank divided into a plurality of sub-banks, wherein the plurality of sub-banks are divided based on bit lines and simultaneously process a plurality of memory access requests, and a mode register changing a number of a plurality of data channels being independently driven by combining or dividing the plurality of data channels; and
 a memory controller forming and connecting a plurality of data channels to allow the memory device to simultaneously process the plurality of memory access requests, and to control input and output data of the memory device,
 wherein the mode register changes at least a part of data widths of the plurality of data channels to be different from one another by combining or dividing the plurality of data channels.

9. The memory system of claim 8, wherein the each of the plurality of sub-banks comprises a sense amplifier,
 wherein the memory device and the memory controller are connected by an address channel, a command and control signal channel, and a plurality of data channels, and
 wherein the memory device comprises a data port comprising a plurality of data channels, and the number of the plurality of data channels of the data port corresponds to the number of the plurality of memory access requests which are processed simultaneously.

10. The memory system of claim 8, wherein a part of the plurality of data channels are combined or separated to increase or decrease a data width, respectively.

11. The memory system of claim 8, wherein each of the plurality of sub-banks performs precharge and active operations.

12. The memory system of claim 8, wherein the memory device receives at least one memory access request from the memory controller and transmits the at least one memory access request to a corresponding memory bank, wherein the at least one memory access request is transmitted to the corresponding memory bank in the order of receipts or reordered to increase the memory device efficiency.

13. A memory device for multiple processors, the memory device comprising:
 a command and control signal port receiving a command and control signal from a memory controller;
 an address port receiving an address signal from the memory controller;
 a plurality of memory banks, wherein each of the plurality of memory banks is divided into a plurality of sub-banks; and
 a mode register changing a number of the plurality of data channels being independently driven by combining or dividing the plurality of data channels,
 wherein the plurality of sub-banks are divided based on bit lines, and each of the plurality of sub-banks simultaneously performs operations according to a plurality of memory access requests when the plurality of memory access requests are transmitted through the command and control signal port and the address port,
 wherein each of the plurality of sub-banks has different address area from one another and comprises a sense amplifier, and
 wherein the mode register changes at least a part of data widths of the plurality of data channels to be different from one another by combining or dividing the plurality of data channels.

14. The memory device of claim 13, the memory device further comprising:
 a switch coupled to the plurality of memory banks, and selecting and connecting a plurality of data channels; and
 an input and output circuit coupled to the switch.

* * * * *